(12) United States Patent
Matsuo

(10) Patent No.: US 8,908,067 B2
(45) Date of Patent: Dec. 9, 2014

(54) IMAGING SYSTEMS WITH DIGITALLY CONTROLLED ANALOG OFFSET COMPENSATION

(75) Inventor: Shinichiro Matsuo, Kawasaki (JP)

(73) Assignee: Aptina Imaging Corporation, George Town (KY)

( * ) Notice: Subject to any disclaimer, the term of this patent is extended or adjusted under 35 U.S.C. 154(b) by 314 days.

(21) Appl. No.: 13/556,911

(22) Filed: Jul. 24, 2012

(65) Prior Publication Data

US 2013/0027578 A1 Jan. 31, 2013

Related U.S. Application Data

(60) Provisional application No. 61/512,626, filed on Jul. 28, 2011.

(51) Int. Cl.
*H04N 9/64* (2006.01)
*H04N 5/217* (2011.01)
*H04N 5/3745* (2011.01)
*H04N 5/365* (2011.01)
*H04N 5/374* (2011.01)
*H04N 5/378* (2011.01)

(52) U.S. Cl.
CPC .............. *H04N 5/374* (2013.01); *H04N 5/3745* (2013.01); *H04N 5/3658* (2013.01); *H04N 5/378* (2013.01)
USPC ............................ 348/245; 348/241; 348/243

(58) Field of Classification Search
USPC ........................................ 348/241, 243, 245
See application file for complete search history.

(56) References Cited

U.S. PATENT DOCUMENTS 8,405,747 B2 * 3/2013 Mo et al. .................. 348/245
2006/0001753 A1   1/2006 Funakoshi
2007/0019085 A1   1/2007 Suzuki

FOREIGN PATENT DOCUMENTS

GB    2425229       10/2006
WO    2009137030    11/2009

* cited by examiner

*Primary Examiner* — Joel Fosselman
(74) *Attorney, Agent, or Firm* — Treyz Law Group

(57) ABSTRACT

An image sensor may be provided that includes an image pixel array, analog column circuitry and digital column circuitry. The digital column circuitry may extract a systematic analog signal offset from data received from the analog column circuitry. The digital column circuitry may generate analog signal offset correction values based on the systematic analog signal offsets and provide the analog signal offset correction values to the analog column circuitry. The analog column circuitry may remove signal offsets from subsequently read out image data from the image pixel array using the analog signal offset correction values provided by the digital column circuitry. The image pixel array may include image pixels having color filters of various colors. The digital column circuitry may generate analog signal offset correction values corresponding to each of the various colors.

21 Claims, 10 Drawing Sheets

IMAGING SYSTEMS WITH DIGITALLY CONTROLLED ANALOG OFFSET COMPENSATION

This application claims the benefit of provisional patent application No. 61/512,626, filed Jul. 28, 2011, which is hereby incorporated by reference herein in its entirety.

BACKGROUND

This relates generally to imaging devices, and more particularly, to imaging devices with column control and readout circuitry.

Modern electronic devices such as cellular telephones, cameras, and computers often use digital image sensors. Imagers (i.e., image sensors) may be formed from a two-dimensional array of image sensing pixels. Each pixel may include a photosensor such as a photodiode that receives incident photons (light) and converts the photons into electrical signals. Image sensors are sometimes designed to provide images to electronic devices using a Joint Photographic Experts Group (JPEG) format or any other suitable image format.

Image data is commonly readout from image pixels using circuitry coupled to each column of image pixels. This column circuitry can include analog circuits that may contribute a systematic offset to the image data. This type of systematic offset can cause digital circuitry that receives the analog data to have a limited dynamic range due to bits that are allocated to represent the offset.

It would therefore be desirable to be able to provide improved imaging devices.

DETAILED DESCRIPTION

Electronic devices such as digital cameras, computers, cellular telephones, and other electronic devices include image sensors that gather incoming light to capture an image. The image sensors may include arrays of imaging pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Image sensor circuitry may include analog and digital column circuitry that is used in reading out image data from the image sensor pixels to additional processing circuitry. The digital column circuitry may be configured to digitally extract a systematic signal offset (e.g., an analog signal offset that is added to the image data by the analog column circuitry) from image data received from the analog column circuitry. The digital column circuitry may be used to provide a systematic signal offset correction to the analog column circuitry. The analog column circuitry may generate offset-compensated image data using the provided systematic signal offset correction.

Figure 1:
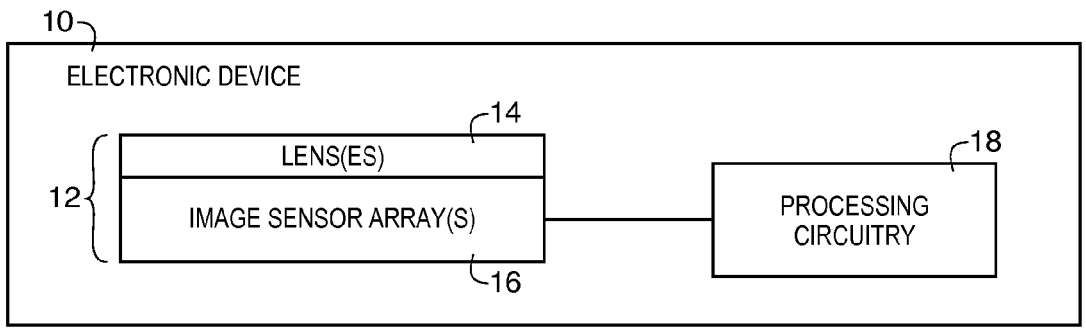
FIG. 1 is a diagram of an illustrative electronic device in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 may convert analog image signals into corresponding digital image data. Image sensor 16 may provide the corresponding digital image data to processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
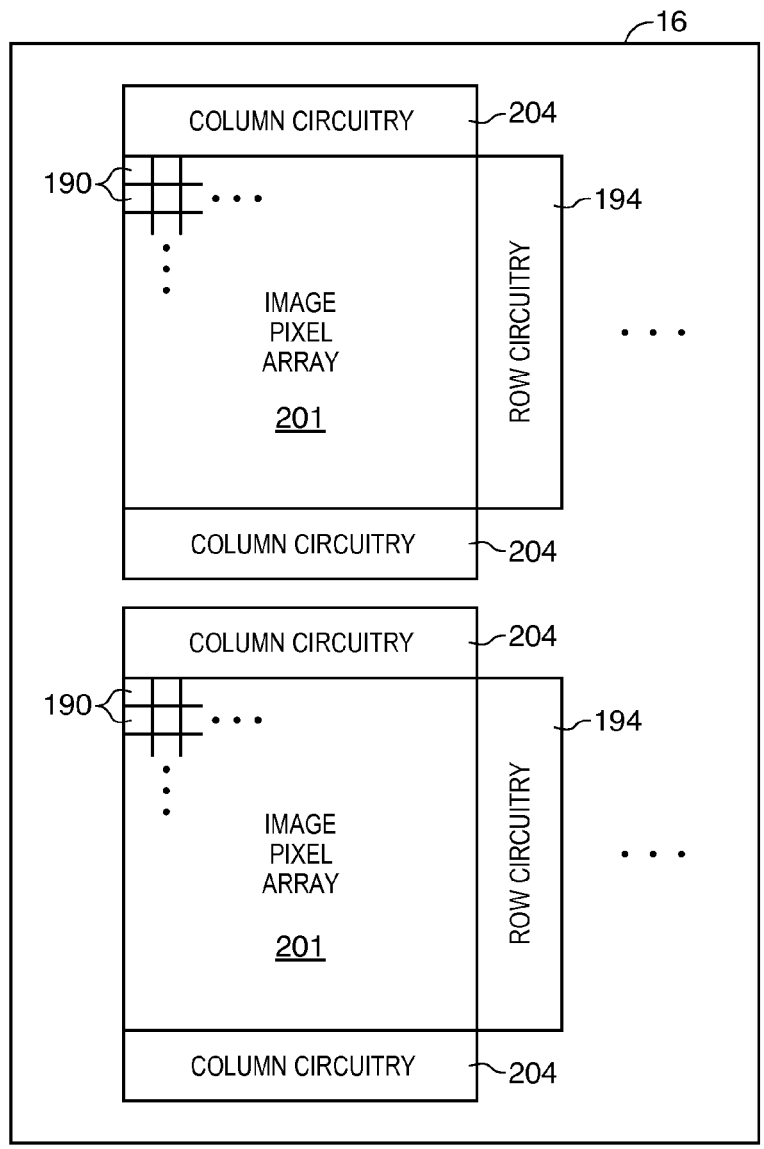
FIG. 2 is a diagram of an illustrative image sensor having multiple image pixel arrays with row circuitry and column circuitry in accordance with an embodiment of the present invention.

As shown in FIG. 2, image sensor 16 may include one or more image pixel arrays such as pixel arrays 201 containing imaging pixels such as image sensor pixels 190. Imaging pixels 190 may be configured to convert light that is incident on image pixels 190 into analog image signals (e.g., voltages corresponding to electrical charges that have been generated in response to the incident light).

Each pixel array 201 may contain, for example, hundreds or thousands of rows and columns of image sensor pixels 190. Image sensor 16 may include circuitry for operating image pixels 190 such as row circuitry 194 (e.g., circuitry for providing row control signals to pixels 190 in each pixel row) and column control and readout circuitry such as column circuitry 204 (e.g., circuitry for providing bias signals and for reading out image signals along column lines coupled to each pixel column).

Row control circuitry 194 may be used to supply control signals such as reset, transfer, and read control signals row-by-row to pixels 190. One or more conductive lines may be coupled to each pixel column in array 201. Column lines may be used for reading out image signals from pixels 190 and for supplying bias signals (e.g., bias currents or bias voltages) to pixels 190. During pixel readout operations, a pixel row in array 201 may be selected by row control circuitry 194 and image data associated with image pixels 190 in that pixel row can be read out using column circuitry 204 (e.g., along the column lines).

Figure 3:
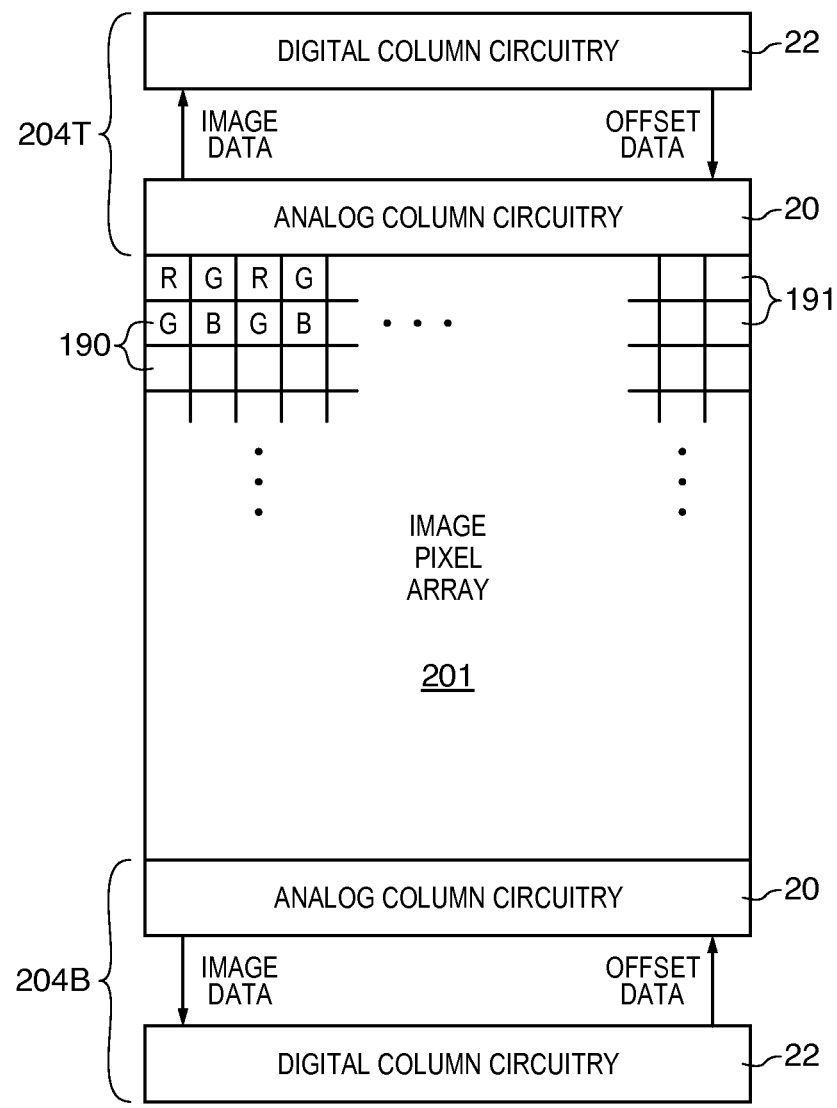
FIG. 3 is a diagram of an illustrative image pixel array having analog and digital column circuitry in accordance with an embodiment of the present invention.

As shown in FIG. 3, column circuitry 204 may be formed on multiple sides of an associated image pixel array 201. In the example of FIG. 3, column circuitry 204 includes top column circuitry 204T and bottom column circuitry 204B. Top column circuitry 204T may be used to readout image data from a first set of pixel rows in array 201 and bottom column circuitry 204B may be used to readout image data from a second set of pixel rows in array 201.

Pixel array 201 may include image pixels 190 having associated color filters. Color filters associated with each pixel transmit light with a wavelength in a particular range into the associated pixel. In one suitable example, pixel array 190 may be provided with color filter array having a Bayer color pattern in which alternating pixel rows include pixels having alternating color sets (e.g., one pixel row may include red (R) and green (G) pixels and adjacent pixel rows may include green (G) and blue (B) pixels). Green pixels in a common pixel row with red pixels may be referred to herein as G(R) pixels and green pixels in a common pixel row with blue pixels may be referred to herein as G(B) pixels. Pixel rows having red pixels and green pixels may be referred to herein as GR pixel rows. Pixel rows having green pixels and blue pixels may be referred to herein as GB pixel rows.

Pixel array 201 may also include pixels 191 that are prevented from receiving image light. Pixels 191 may be referred to herein as dark pixels, optically blocked pixels, optical black pixels, optically black pixels, or OB pixels.

Column circuitry 204 may include analog column circuitry 20 and digital column circuitry 22. Analog column circuitry 20 may receive analog image signals from image pixels 190 and perform analog signal processing operations on the analog image signals. Analog column circuitry 20 may include sample-and-hold circuitry, amplifier circuitry, analog-to-digital conversion circuitry, bias circuitry or other circuitry for analog signal processing operations.

Analog column circuitry 20 may convert the analog image signals into digital image signals and provide the digital image signals to digital column circuitry for further processing. Digital column circuitry 22 may perform image processing operations such as image combination operations, image storage operations, image enhancement operations, and other image processing operations. Digital column circuitry 22 may include microprocessors, memory (e.g., one or more frame buffers, line buffers, volatile memory or non-volatile memory), or other circuitry for performing digital image data processing operations. Digital column circuitry 22 may be used to extract a systematic analog signal offset that has been added to image signals from pixels 190 and to generate a code (signal offset value) to be provided to analog column circuitry 20. The code may be a digital-to-analog offset code (DAC code) that can be used by the analog column circuitry to remove the extracted systematic signal bias from subsequently read image data. The code may, for example, be a lookup table of respective signal offset corrections to be applied to image data from R, G(R), B, and G(B) pixels.

Figure 4:
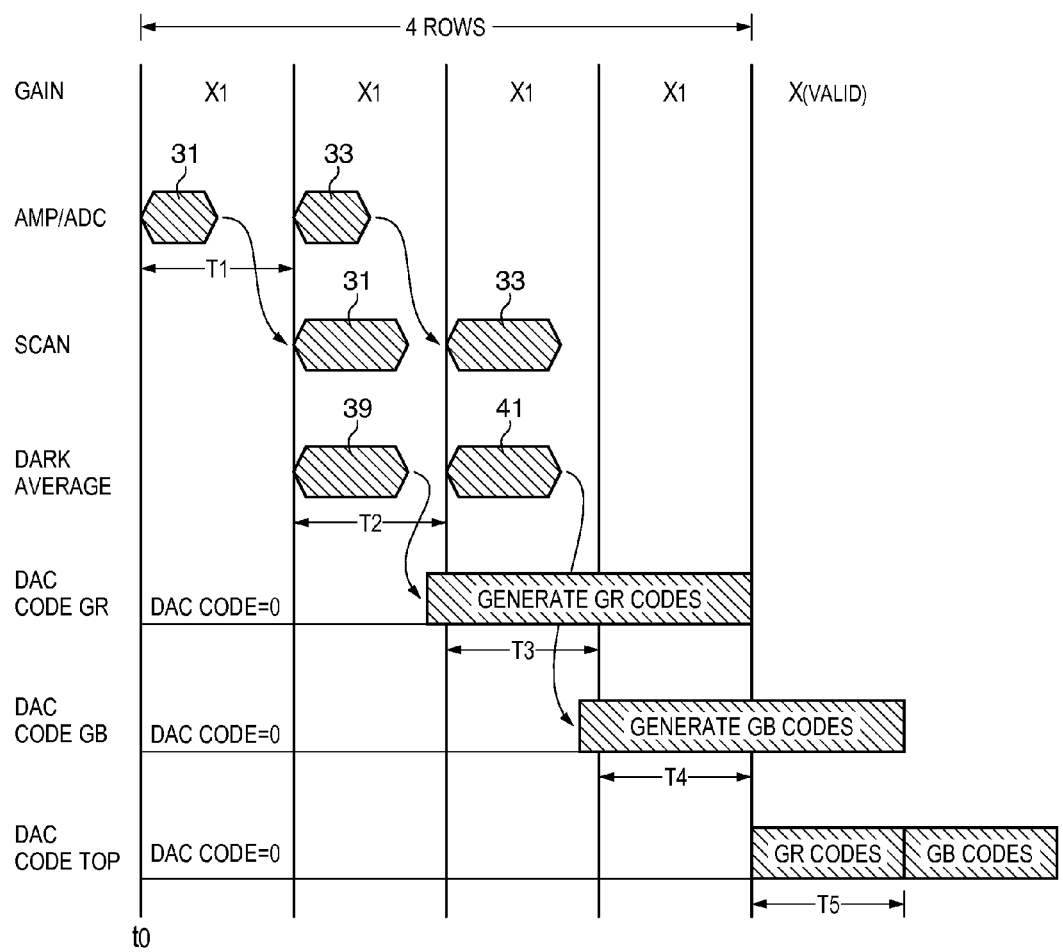
FIG. 4 is an illustrative timing diagram showing how image data may be gathered and processed to form analog signal offset codes in accordance with an embodiment of the present invention.

The timing chart of FIG. 4 shows how analog offset compensation values (DAC codes) may be generated for pixels of each color while reading out the first several pixel rows in a pixel array such as array 201. When offset calculation starts at time t0, the DAC code for all pixels may be set to zero and an analog signal gain to be applied to the image signals is set to one (x1). During the readout of image signals from the first pixel row (e.g., a GR pixel row) in array 201 (during time interval T1) using, for example an amplifier (AMP) and an analog-to-digital converter (ADC), signal offset values 31 for the GR pixel rows may be read out and stored into memory. Signal offset values 33 for the GB pixel rows may be read out during readout of image signals from the second pixel row (e.g., a GB pixel row) during time interval T2.

During time interval T2, the offset values 31 for the GR pixel rows may be scanned out from the memory to be used for calculation of an average signal offset (Dark average) 39 for the GR pixel rows. Once the memory scan finishes, GR DAC codes for the GR pixel rows (e.g., a G(R) DAC code and an R DAC code) may be obtained (during interval T3). Also during interval T3, the signal offset values 33 for the GB pixel rows may be scanned out from the memory to be used for calculation of an average signal offset (Dark average) 41 for the GB pixel rows. GB DAC codes for the GB pixel rows (e.g., a G(B) DAC code and a B DAC code) may be obtained when memory scan of GB finishes (e.g., at the beginning of time interval T4).

When row operations for the first four pixel rows is completed at the end of interval T4, GR DAC codes and GB DAC codes may be used for analog signal offset compensation operations for subsequently readout pixel rows. The analog signal gain to be applied to pixel signals from all pixel rows read out after the analog signal offset calculation is complete can be set to any valid value and gain-compensated DAC codes may be transferred to the analog column circuitry through a DAC bus. DAC codes for red pixels and blue pixels may be provided to analog column circuitry in bottom column circuitry 204B (for example) of FIG. 3. DAC codes for G(R) pixels and G(B) pixels may be provided to analog column circuitry in top column circuitry 204T (for example). DAC codes (signal offset correction values) for pixels of a given color may be multiplexed from the provided DAC codes using a control signal that indicates whether an even pixel row or odd pixel row is being read out.

Figure 5:
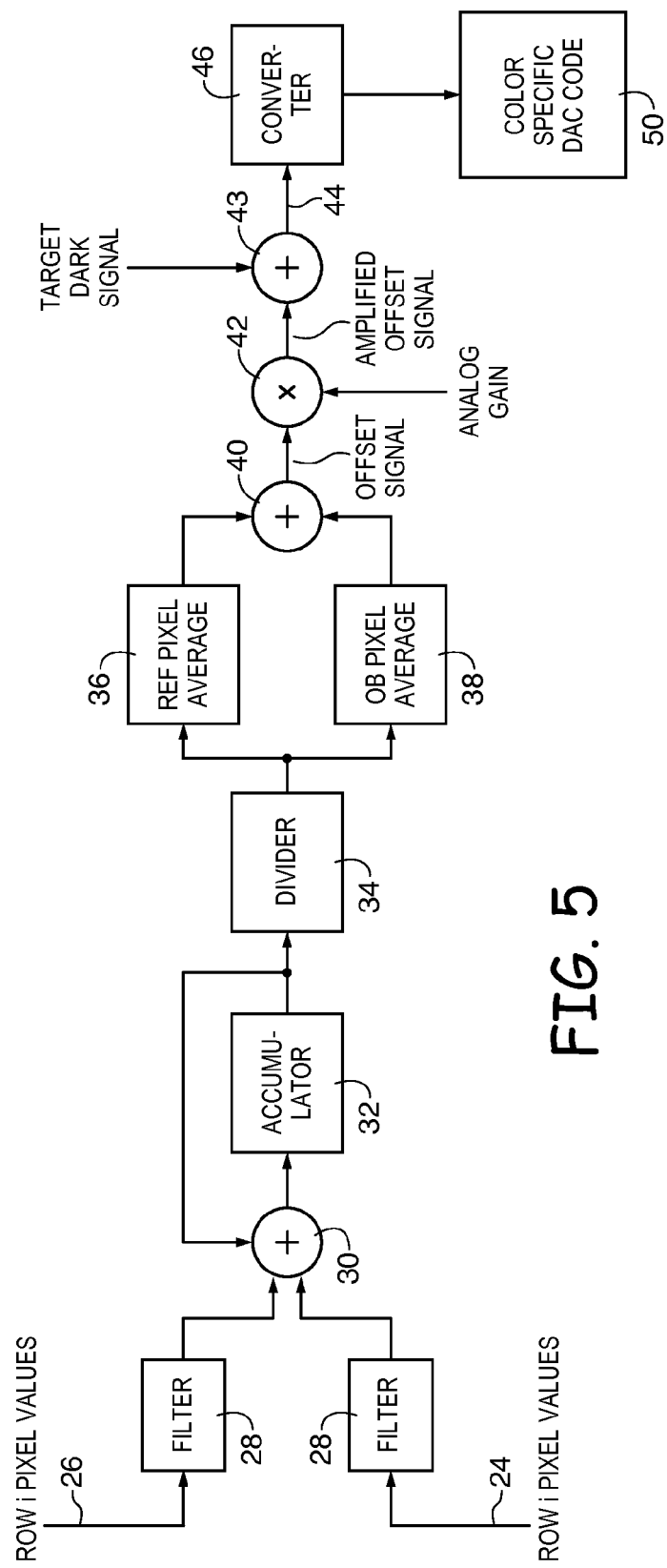
FIG. 5 is a diagram of an illustrative system for generating analog signal offset codes from image data in accordance with an embodiment of the present invention.

FIG. 5 is a diagram showing how top and bottom digital column circuitry such as circuitry 22 (FIG. 3) may be used to concurrently process digital image data received from analog column circuitry such as circuitry 20. As shown in FIG. 5, digital image data such as digital pixel values from an ith pixel row may be split between two data paths such as data paths 24 and 26. Pixel values may from the ith pixel row may be alternately provided to paths 24 and 26 or may be provided to paths 24 and 26 in groups. Pixel values from the ith pixel row may include image pixel values and dark pixel values. Dark pixel values may be generated by pixels 191 that are blocked from receiving image light. Dark pixel values may be read out from this type of optically blocked pixel in the same way that image data is read out from light-exposed image pixels 190.

Digital pixel values may be filtered by filtering engines 28. Filtering digital pixel vales may include, for example, discarding pixel values outside of a given range of pixel values or discarding a high and a low pixel value among a group of pixel values.

Filtered digital pixel values from each data path 24 and 26 may be accumulated and summed using accumulator 32 and addition engine 30. A dividing engine such as divider 34 may be used to divide the accumulated sum received from accumulator 32 and addition engine 30 by, for example, a number of pixels associated with the accumulated sum to obtain pixel average values for each type of pixel (i.e., light-exposed pixels and optically blocked (OB) pixels). A pixel average of pixel values from light-exposed pixels may be referred to as a reference pixel average (Ref pixel average in FIG. 5) and a pixel average of pixel values from OB pixels (sometimes referred to optical black pixels) may be referred to as an OB pixel average.

The Ref pixel average and the OB pixel average may be temporarily stored in respective storages 36 and 38 and then differenced by addition engine 40 to generate an offset signal corresponding to the analog offset that was added to the image signal by the analog column circuitry. Digital amplifier 42 may then be used, if desired, to multiply the offset signal by an analog gain. The analog gain may be a value such as 1, 2, 3, or any other suitable gain value.

An amplified offset signal (i.e., the offset signal multiplied by the gain) may then be differenced with a target offset signal using addition engine 43. The target offset signal may be a desired level of offset of digital image values to be received by digital column circuitry 22 that results in a relatively larger dynamic range of image signal values that can be represented in digital pixel values by circuitry 22.

An analog signal offset correction value may then be provided along path 44 to converter 46. Converter 46 may be used to generate DAC codes such as color-specific DAC code 50 that can be provided to analog circuitry 20 for generating offset-compensated image data. The DAC codes generated by converter 46 may be common for pixels of all colors or may be specific to pixels of one color. Color-specific DAC codes 50 may be generated by running the system of FIG. 5 once for each color in array 201.

Filtering engines 28, addition engines 30, 40, and 43, accumulator 32, divider 34, converter 46, and storage 36 and 38 may be implemented using processing circuitry such as column circuitry 204T and/or 204B of FIG. 3.

As described above in connection with FIG. 4, color-specific DAC codes such as DAC codes for G(R) pixels and G(B) pixels may be provided to analog column circuitry in top column circuitry 204T and color-specific DAC codes such as DAC codes for R pixels and B pixels may be provided to analog column circuitry in bottom column circuitry 204B.

Figure 6:
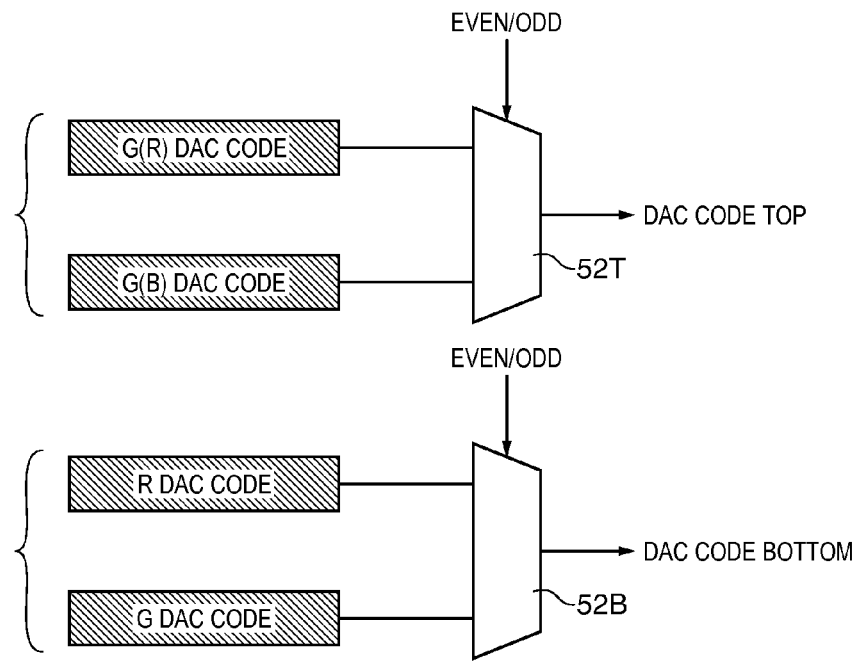
FIG. 6 is an illustrative timing diagram showing how analog signal offset codes may be multiplexed when making offset corrections to image data in accordance with an embodiment of the present invention.

FIG. 6 is a diagram showing how DAC codes for pixels of a given color may be alternately used to perform image signal offset compensation operations for pixels of that color. Column circuitry 204T and 204B may respectively include multiplexers 52T and 52B. Using multiplexer 52T, column circuitry 204T may provide a DAC code top value that is either a G(R) DAC code or a G(B) DAC code. Using multiplexer 52B, column circuitry 204B may provide a DAC code bottom value that is either a R DAC code or a B DAC code. Multiplexer 52T may receive a row signal such as an even/odd row signal and select, for example, the G(R) DAC code or the G(B) DAC code based on the even/odd row signal. Multiplexer 52B may receive a row signal such as an even/odd row signal and select, for example, the R DAC code or the B DAC code based on the even/odd row signal.

Figure 7:
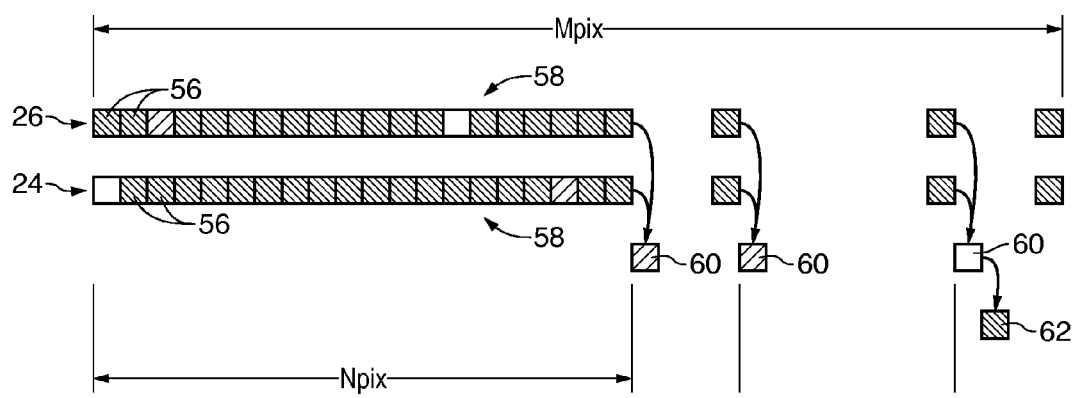
FIG. 7 is an illustrative diagram showing how image data from a row of image pixels may be combined during offset correction determination operations in accordance with an embodiment of the present invention.

FIG. 7 is a diagram showing how digital pixel values from image pixels in portions of each pixel row may be filtered, accumulated and summed by accumulator 32 and addition engine 30 of FIG. 5. Data such as digital pixel values 56 from a given pixel row flowing in both data paths 24 and 26 may be used to calculate either a Ref pixel average or an OB pixel average. Prior to forming average values, filtering engines 28 may be used to discard the maximum (max) and minimum (min) pixel values in a group of pixels such as groups 58 containing a number Npix pixel values 56. In the example of FIG. 7, Npix is equal to eighteen. However, this is merely illustrative.

Addition engine 30 may then sum the remaining (non-discarded) pixel values in the groups 58 to form a sum 60. Accumulator 32 may accumulate sums 60 from multiple sets of groups 58 (i.e., sets including one group for each data path). After group sums 60 have been obtained for a number Mpix pixels, a final sum such as sum 62 may be obtained. Mpix may be a number of pixels in a row of pixels, in half of a row of pixels, etc. Sum 62 may be obtained using, for example, 2048 pixel values out of 2304 pixel values in a pixel row. Sum 62 may later be divided by the number of pixel values (e.g., 2×Mpix) included in the sum to obtain an average value for each type of pixel.

Figure 8:
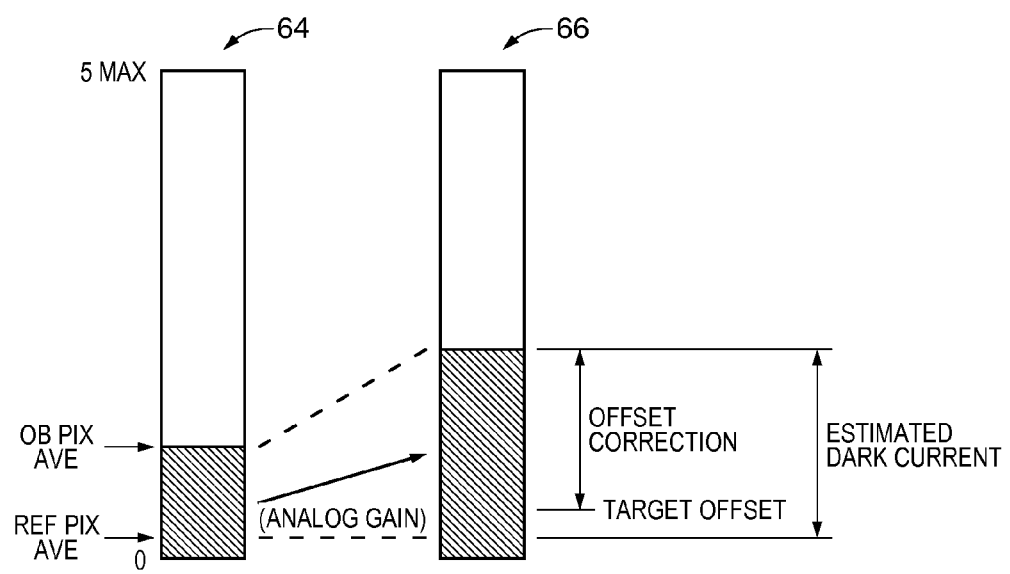
FIG. 8 is an illustrative diagram showing how analog signal offset codes may be generated using a signal conversion gain in accordance with an embodiment of the present invention.

FIG. 8 is a diagram showing how a DAC code may be generated that is using an analog gain that is to be applied to image data read out from pixel array 201. In the example of FIG. 8, during measurement of the offset signal corresponding to the analog offset that is added to the image signal by the analog column circuitry, the analog gain is set to one and the offset signal (referred to as Dark Current in chart 64 of FIG. 8) is obtained by subtracting the reference pixel average from the OB pixel average as described above in connection with FIG. 5. When an analog gain such as a 2× analog gain is applied (e.g., by digital amplifier 42), the amplified offset (referred to as Estimated dark current in chart 66 of FIG. 8) may be calculated from the offset multiplied by the analog gain. The offset correction to be removed from image data to be obtained may then be generated by subtracting the target offset from the amplified offset (Estimated dark current).

Figure 9:
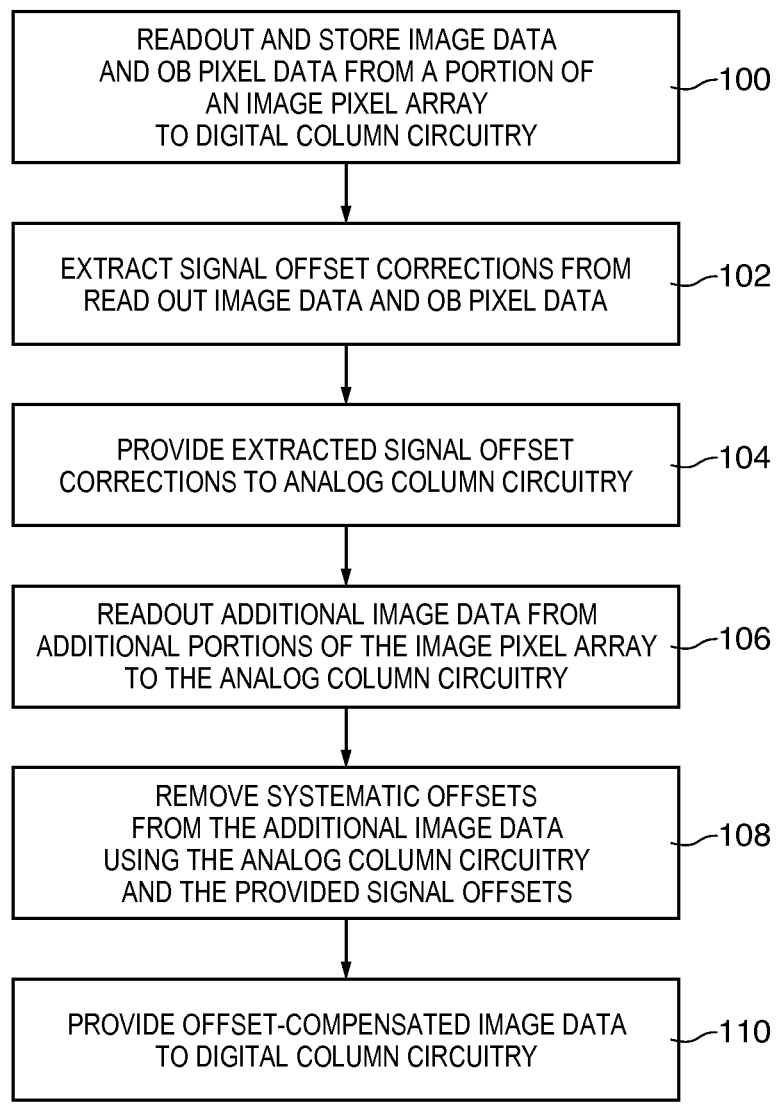
FIG. 9 is a flow chart of illustrative steps involved in generating analog offset-compensated image data using an image sensor in accordance with an embodiment of the present invention.

FIG. 9 is a flow chart of illustrative steps involved determining and removing analog signal offset corrections from image data captured using an image sensor of the type shown in, for example, FIG. 2.

At step 100, image data and dark pixel data (OB pixel data) may be read out for a portion of an image pixel array (e.g., a row of image pixels) to digital column circuitry. The image data may be read out to the digital column circuitry using analog column circuitry that performs analog signal processing operations on analog image signals before converting the analog image signals to digital image signals and providing the digital image signals to the digital column circuitry.

At step 102, analog signal offset corrections (DAC codes) may be extracted from the image data and dark signal data that has been read out to the digital column circuitry as described above in connection with, for example, FIG. 5.

At step 104, the extracted signal offset corrections may be provided to the analog column circuitry.

At step 106, additional image data may be read out from additional portions of the image pixel array (e.g., additional pixel rows) to the analog column circuitry.

At step 108, systematic analog signal offsets may be removed from the additional image data using the analog column circuitry by applying the analog signal offset corrections to the additional image data.

At step 110, offset-compensated image data (i.e., image data that has had systematic analog signal offsets removed) may be provided to the digital column circuitry for further processing. The digital column circuitry may process the offset-compensated image data and provide processed and/or unprocessed digital image data to additional circuitry such as processing circuitry 18 of FIG. 1.

Figure 10:
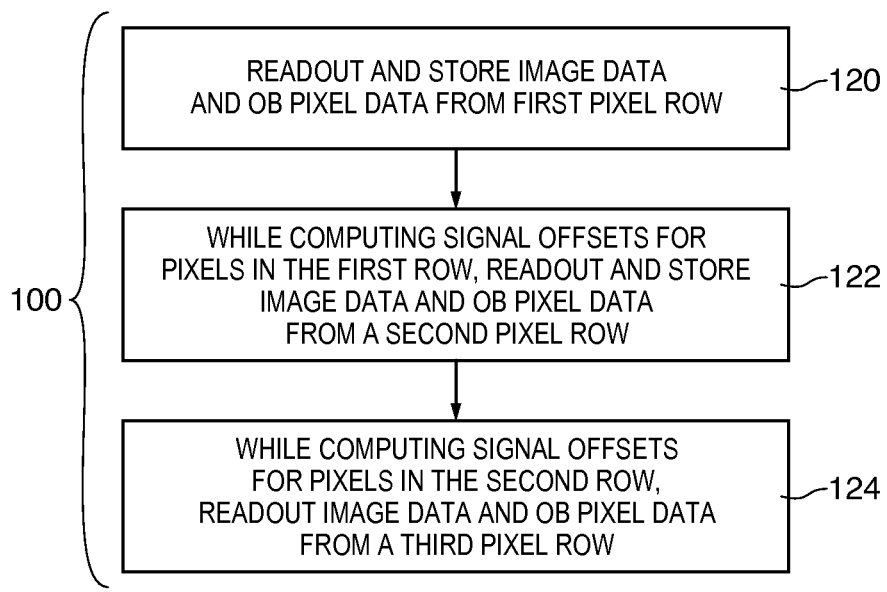
FIG. 10 is a flow chart of illustrative steps involved in reading out and storing image data and dark pixel data from a portion of an image pixel array as described above in connection with FIG. 9 in accordance with an embodiment of the present invention.

FIG. 10 is a flow chart of illustrative steps involved reading out and storing image data and optical black (OB) pixel data from a portion of an image pixel array to digital column circuitry as described above in connection with step 100 of FIG. 9.

At step 120, image data and OB pixel data from image pixels in a first pixel row may be readout and stored. Reading out and storing image data and OB pixel data may include reading out analog image signals from columns of image pixels along column lines to analog column circuitry and, using the analog column circuitry, converting the analog image signals to digital pixel values.

At step 122, the data from the image pixels in the second pixel row may be readout and stored while signal offsets associated with the image data and the OB pixel data from the image pixels in the first pixel row are being computed.

At step 124, the data from the image pixels in the third pixel row may be readout and stored while signal offsets associated with the image data and the OB pixel data from the image pixels in the second pixel row are being computed.

Figure 11:
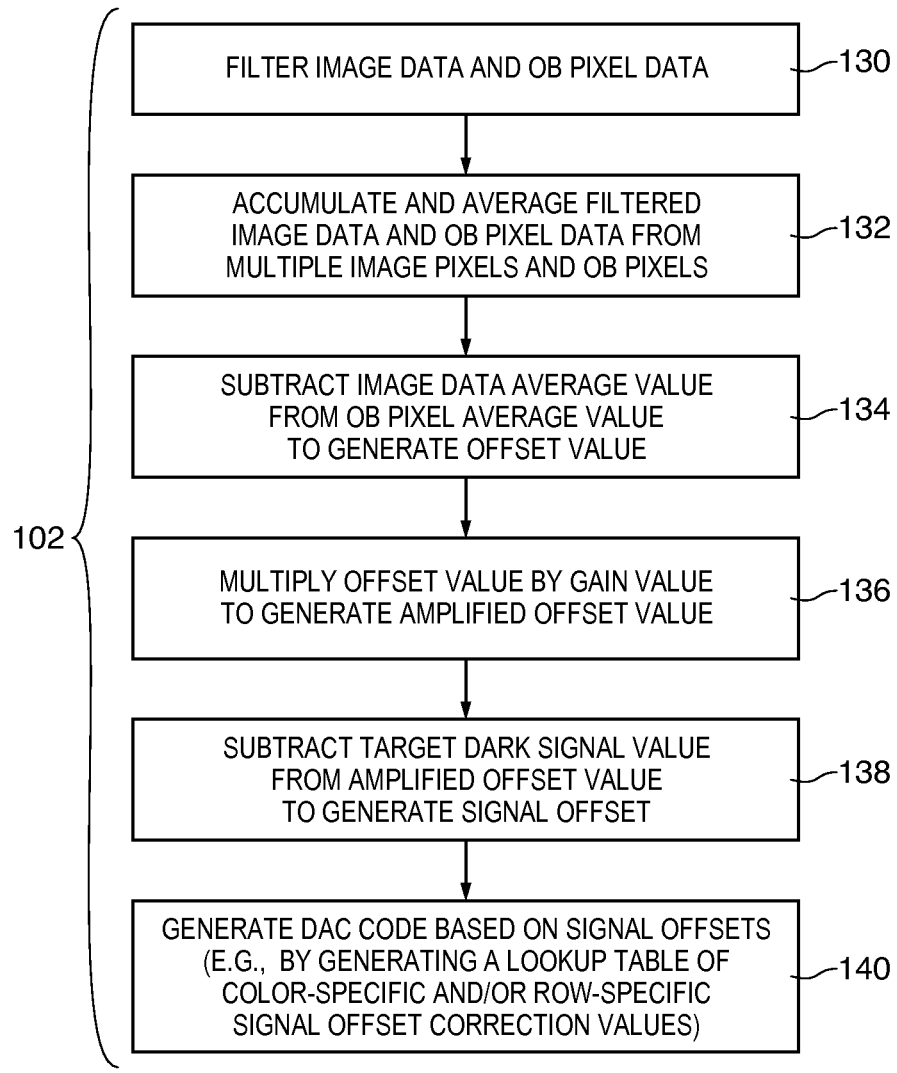
FIG. 11 is a flow chart of illustrative steps involved in generating signal offsets using read out image data and dark pixel data as described above in connection with FIG. 9 in accordance with an embodiment of the present invention.

FIG. 11 is a flow chart of illustrative steps involved in extracting signal offset corrections from image data and OB pixel data as described above in connection with step 102 of FIG. 9.

At step 130, image data and OB pixel data may be filtered as described above in connection with FIGS. 5 and 7 (as examples).

At step 132, filtered image data and OB pixel data from multiple image pixels and OB pixels may be accumulated and averaged to compute image data average values (Ref pixel averages) and OB pixel average values.

At step 134, the image data average values may be subtracted from the OB pixel average values to generate an offset value using, for example, addition engine 40 of FIG. 5.

At step 136, the offset value may be multiplied by a gain value such as an analog gain value to generate an amplified offset value.

At step 138, a target dark signal value may be subtracted from the generated amplified offset value to generate a measured signal offset.

At step 140, a DAC code (analog offset compensation value) may be generated based on the generated signal offset. The DAC code may be generated by populating some or all of a lookup table of color-specific or row-specific signal offset correction values to be removed from image data to be read out from the image pixel array.

Figure 12:
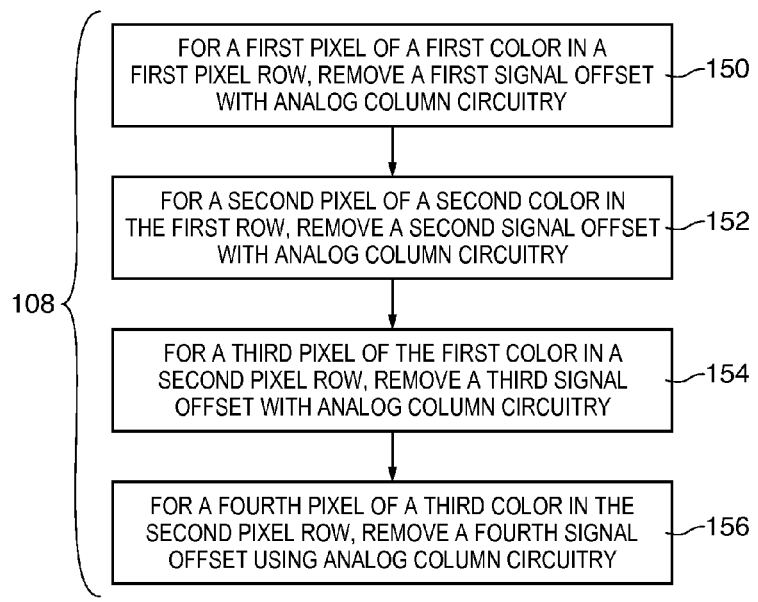
FIG. 12 is a flow chart of illustrative steps involved in removing digitally derived systematic offsets from image data using analog column circuitry as described above in connection with FIG. 9 in accordance with an embodiment of the present invention.

FIG. 12 is a flow chart of illustrative steps involved in removing systematic offsets from image data using analog column circuitry and provided signal offsets as described above in connection with step 108 of FIG. 9.

At step 150, a first signal offset may be removed from an image signal from a first pixel in a first pixel row. The first pixel in the first pixel row may be, for example, a red image pixel. The first signal offset may be a signal offset correction (e.g., R DAC code of FIG. 6) determined using image signals from red image pixels in the pixel array. The first signal offset value may be provided to the analog column circuitry using a multiplexer such as multiplexer 52B of FIG. 6 or the first signal offset value may be stored within the analog column circuitry and provided to offset removal circuitry in the analog column circuitry using a multiplexer such as multiplexer 52B.

At step 152, a second signal offset may be removed from an image signal from a second pixel in the first pixel row. The second pixel in the first pixel row may be, for example, a green image pixel. The second signal offset may be a signal offset correction (e.g., G(R) DAC code of FIG. 6) determined using image signals from green image pixels in the pixel array. The second signal offset value may be provided to the analog column circuitry using a multiplexer such as multiplexer 52T of FIG. 6 or the second signal offset value may be stored within the analog column circuitry and provided to offset removal circuitry in the analog column circuitry using a multiplexer such as multiplexer 52T.

At step 154, a third signal offset may be removed from an image signal from a third pixel in a second pixel row. The third pixel in the second pixel row may be, for example, a green image pixel. The third signal offset may be a signal offset correction (e.g., G(B) DAC code of FIG. 6) determined using image signals from green image pixels in the pixel array. The third signal offset value may be provided to the analog column circuitry using a multiplexer such as multiplexer 52T of FIG. 6 or the third signal offset value may be stored within the analog column circuitry and provided to offset removal circuitry in the analog column circuitry using a multiplexer such as multiplexer 52T.

At step 156, a fourth signal offset may be removed from an image signal from a fourth pixel in the second pixel row. The fourth pixel in the second pixel row may be, for example, a blue image pixel. The fourth signal offset may be a signal offset correction (e.g., B DAC code of FIG. 6) determined using image signals from blue image pixels in the pixel array. The fourth signal offset value may be provided to the analog column circuitry using a multiplexer such as multiplexer 52B of FIG. 6 or the fourth signal offset value may be stored within the analog column circuitry and provided to offset removal circuitry in the analog column circuitry using a multiplexer such as multiplexer 52B.

Each of the steps 150, 152, 154, and 156 of FIG. 12 may be repeated in any suitable order until offset-compensated image signals have been generated for image pixels of a pixel array such as array 201. For example, the first signal offset of step 150 may be applied to all red pixels of the pixel array, the second signal offset of step 152 may be applied to all green pixels of the pixel array that are located in a common pixel row with red pixels, the third signal offset of step 154 may be applied to all green pixels of the pixel array that are located in a common pixel row with blue pixels, and the fourth signal offset of step 154 may be applied to all red pixels of the pixel array.

Figure 13:
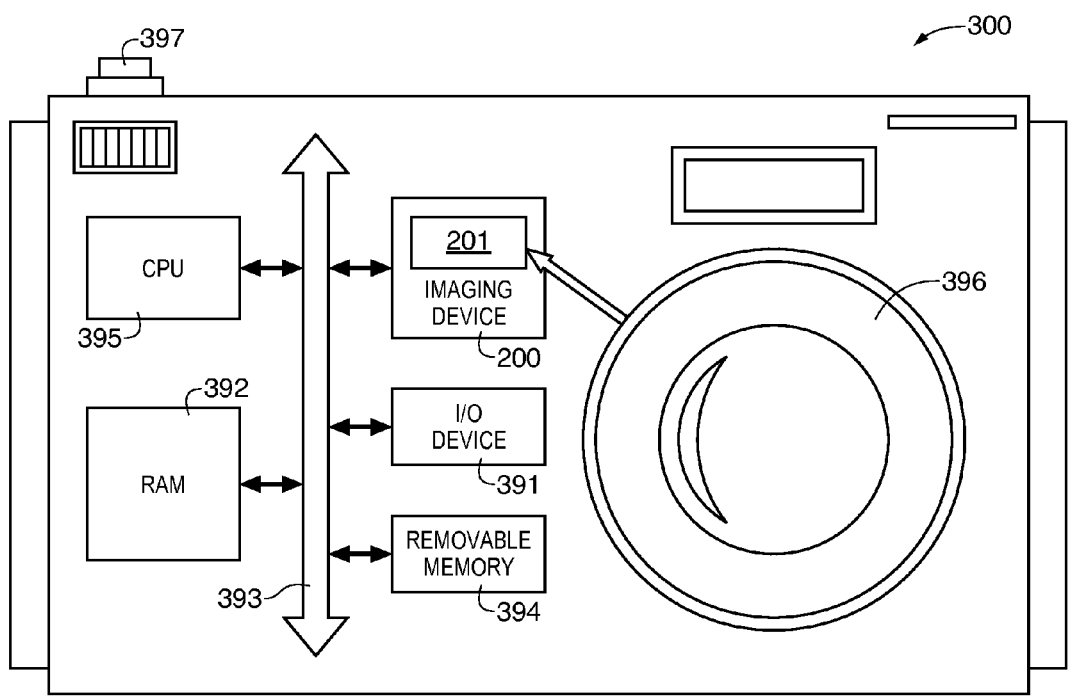
FIG. 13 is a block diagram of an imager employing the embodiment of FIG. 5 in accordance with an embodiment of the present invention.

FIG. 13 shows in simplified form a typical processor system 300, such as a digital camera, which includes an imaging device 200. Imaging device 200 may include a pixel array 201 of the type shown in FIG. 2 having digital column circuitry that determines an analog signal offset correction using image data from analog column circuitry and provides the determined analog signal offset correction to the analog column circuitry. Processor system 300 is exemplary of a system having digital circuits that may include imaging device 200. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating image sensors that include an image pixel array, analog column circuitry and digital column circuitry. Image sensors with analog column circuitry and digital column circuitry may be used in an electronic device. The analog column circuitry may perform analog signal processing operations on image data and/or optically blocked pixel data. The analog column circuitry may convert the analog signals into digital pixel values and provide the digital pixel values to the digital column circuitry.

The digital column circuitry may extract a systematic analog signal offset from image data and optically blocked pixel data from a portion of the pixel array. The digital column circuitry may generate analog signal offset correction values and provide the analog signal offset correction values to the analog column circuitry. The analog column circuitry may remove a systematic signal offset from subsequently read out image data using the analog signal offset correction values provided by the digital column circuitry.

The foregoing is merely illustrative of the principles of this invention which can be practiced in other embodiments.

What is claimed is:

1. A method of generating offset-compensated image data using an image sensor with an array of image pixels arranged in pixel rows and pixel columns, analog column circuitry coupled to the pixel columns, and digital column circuitry coupled to the analog column circuitry, the method comprising:
   with the analog column circuitry, providing image data from a portion of the image pixels to the digital column circuitry;
   with the digital column circuitry, extracting signal offset correction values from the provided image data;
   with the digital column circuitry, providing the extracted signal offset correction values to the analog column circuitry; and
   with the analog column circuitry, removing signal offsets from additional image data using the provided offset correction values to form offset-compensated analog image signals.

2. The method defined in claim 1, further comprising:
   with the analog column circuitry, converting the offset-compensated analog image signals to digital offset-compensated image data.

3. The method defined in claim 2, further comprising:
   before removing the signal offsets from the additional image data, with the analog column circuitry, reading out the additional image data from an additional portion of the image pixels.

4. The method defined in claim 2 wherein providing image data from the portion of the image pixels to the digital column circuitry comprises providing image data from image pixels in a first pixel row to the digital column circuitry.

5. The method defined in claim 4 wherein providing image data from the portion of the image pixels to the digital column circuitry further comprises providing image data from image pixels in a second pixel row to the digital column circuitry.

6. The method defined in claim 2 wherein extracting the signal offset correction values from the provided image data comprises:
   filtering the provided image data.

7. The method defined in claim 6 wherein extracting the signal offset correction values from the provided image data further comprises:
   accumulating and averaging the filtered image data.

8. The method defined in claim 7 wherein extracting the signal offset correction values from the provided image data further comprises:
   generating the signal offset correction values using the accumulated averaged filtered image data and a target dark signal value.

9. The method defined in claim 8 wherein removing the signal offsets from the additional image data to form the offset-compensated analog image signals comprises:
   removing a signal offset from image signals generated by image pixels having a color filter.

10. The method defined in claim 9 wherein removing the signal offsets from the additional image data to form the offset-compensated analog image signals further comprises:
    removing a red signal offset from image signals generated by image pixels having a red color filter.

11. The method defined in claim 10 wherein removing the signal offsets from the additional image data to form the offset-compensated analog image signals further comprises:
    removing a blue signal offset from image signals generated by image pixels having a blue color filter.

12. The method defined in claim 11 wherein removing a green signal offset from image signals generated by image pixels having a green color filter comprises:
    removing a green-red signal offset from image signals generated by image pixels having a green color filter and sharing a pixel row with image pixels having a red color filter.

13. The method defined in claim 12 wherein removing the signal offsets from the additional image data to form the offset-compensated analog image signals further comprises:
    removing a green-blue signal offset from image signals generated by image pixels having a green color filter and sharing a pixel row with image pixels having a blue color filter.

14. A method of operating an image sensor with a pixel array having image pixels and optically blocked pixels arranged in pixel rows and pixel columns, and having analog column circuitry coupled to the pixel columns and digital column circuitry coupled to the analog column circuitry, the method comprising:
- with the digital column circuitry, determining signal offset correction values using image data from the image pixels and optically blocked pixel data from the optically blocked pixels;
- with the digital column circuitry, providing the determined signal offset correction values to the analog column circuitry; and
- with the analog column circuitry, generating offset-removed image data using additional image data from the image pixels and using the provided signal offset correction values.

15. The method defined in claim 14 wherein determining signal offset correction values using image data from the image pixels and optically blocked pixel data from the optically blocked pixels comprises:
- generating an average image data value using the image data; and
- generating an average optically blocked pixel value using the optically blocked pixel data.

16. The method defined in claim 15 wherein determining signal offset correction values using image data from the image pixels and optically blocked pixel data from the optically blocked pixels further comprises:
- subtracting the average image data value from the average optically blocked pixel value to form an offset value.

17. The method defined in claim 16 wherein determining signal offset correction values using image data from the image pixels and optically blocked pixel data from the optically blocked pixels further comprises:
- multiplying the offset value by an analog gain value to form an amplified offset value.

18. The method defined in claim 17 wherein determining signal offset correction values using image data from the image pixels and optically blocked pixel data from the optically blocked pixels further comprises:
- subtracting a target dark signal value from the amplified offset value to form at least one of the signal offset correction values.

19. A system, comprising:
- a central processing unit;
- memory;
- input-output circuitry; and
- an imaging device, wherein the imaging device comprises:
  - a pixel array having image pixels arranged in pixel rows and pixel columns,
  - analog column circuitry coupled to the pixel columns, and
  - digital column circuitry coupled to the analog column circuitry, wherein the digital column circuitry is configured to generate analog signal offset correction values and provide the analog signal offset correction values to the analog column circuitry.

20. The system defined in claim 19, wherein the pixel array further comprises:
- optically blocked pixels in at least some of the pixel rows, wherein the digital column circuitry is further configured to generate the analog signal offset correction values using image data from the image pixels and optically blocked pixel data from the optically blocked pixels.

21. The system defined in claim 20 wherein the digital column circuitry comprises top digital column circuitry on a first side of the pixel array and bottom digital column circuitry on an opposing second side of the pixel array.

* * * * *